United States Patent
Boehme et al.

(10) Patent No.: US 10,760,617 B2
(45) Date of Patent: Sep. 1, 2020

(54) BEARING DEVICE FOR LOAD REDUCTION

(71) Applicant: Rolls-Royce Deutschland Ltd & Co KG, Blankenfelde-Mahlow (DE)

(72) Inventors: Martin Boehme, Berlin (DE); Gideon Daniel Venter, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 0 days.

(21) Appl. No.: 16/450,501

(22) Filed: Jun. 24, 2019

(65) Prior Publication Data

US 2020/0003261 A1 Jan. 2, 2020

(30) Foreign Application Priority Data

Jul. 2, 2018 (DE) .................. 10 2018 116 019

(51) Int. Cl.
  *F16C 35/077* (2006.01)
  *F16C 35/067* (2006.01)
  *F16C 43/04* (2006.01)

(52) U.S. Cl.
  CPC ............ *F16C 35/067* (2013.01); *F16C 43/04* (2013.01); *F16C 2226/00* (2013.01); *F16C 2360/23* (2013.01)

(58) Field of Classification Search
  CPC ...... F16C 27/045; F16C 27/33; F16C 27/077; F16C 2226/60; F01D 21/045; F01D 25/164
  See application file for complete search history.

(56) References Cited

U.S. PATENT DOCUMENTS

| 4,375,906 A | 3/1983 | Roberts et al. |
| 7,404,678 B2 | 7/2008 | Plona |
| 7,524,112 B2 * | 4/2009 | Gerez .................. F01D 21/045 384/101 |
| 9,777,596 B2 * | 10/2017 | Raykowski ........... F16C 35/067 |
| 2003/0142894 A1 | 7/2003 | Woehrl |
| 2016/0097301 A1 | 4/2016 | Rosenau et al. |

(Continued)

FOREIGN PATENT DOCUMENTS

| DE | 3124462 A1 | 3/1982 |
| DE | 10202977 C1 | 10/2003 |
| EP | 3006680 B1 | 1/2018 |

OTHER PUBLICATIONS

German Search Report dated Mar. 11, 2019 for counterpart German Patent Application No. 10 2018 116 018.6.

*Primary Examiner* — Phillip A Johnson
(74) *Attorney, Agent, or Firm* — Shuttleworth & Ingersoll, PLC; Timothy Klima

(57) ABSTRACT

A bearing assembly for a gas turbine engine comprises a bearing; a bearing bracket, which holds the bearing and is secured by a predetermined breaking device on a connecting element, which can be connected or is connected to a loadbearing structure of the gas turbine engine; a first toothed component mounted on the bearing bracket; and a second toothed component fixed on the connecting element, wherein, after the destruction of the predetermined breaking device, the first toothed component and the second toothed component can be or are brought into engagement with one another in such a way that one of the toothed components can be made to roll on the other. A gas turbine engine and a method are furthermore provided.

15 Claims, 5 Drawing Sheets

(56) References Cited

U.S. PATENT DOCUMENTS

2017/0009603 A1\* 1/2017 Carter ................... F01D 25/164
2017/0234157 A1\* 8/2017 Khan ...................... F01D 21/00
                                                                                      415/229

\* cited by examiner

BEARING DEVICE FOR LOAD REDUCTION

This application claims priority to German Patent Application DE102018116019.4 filed Jul. 2, 2018, the entirety of which is incorporated by reference herein.

The present disclosure relates to a bearing assembly for a gas turbine engine as disclosed herein, and to a method for producing a bearing as disclosed herein.

If a bearing which supports a component movably on another component is subjected to a force which exceeds the rated loadbearing capacity, the bearing and adjoining parts may be damaged. In the case of rotatable support, loads of this kind can be generated, for example, by an unbalance, in particular an unbalance which arises suddenly.

The loss of a fan blade of a gas turbine engine during operation (a "fan blade off event") is usually associated with a particularly severe unbalance, for example. This unbalance results in corresponding radial loads, especially on a bearing adjacent to the fan, a shaft driving the fan and a loadbearing structure of the gas turbine engine. Through an appropriate outlay on materials, for example, gas turbine engines can be configured to withstand such loads.

One possibility for reducing loads immediately after the loss of the fan blade is to use shear pins which connect the bearing to the loadbearing structure and which break when a maximum loadbearing capacity is exceeded. A backup bearing arranged offset relative to the bearing can then ensure the radial positioning of the shaft. For reliable retention of the shaft, this backup bearing is of appropriately robust design, this being reflected, in turn, in the overall weight.

One possible effect of such an arrangement is furthermore a change in the resonant frequency of the shaft after the breakage of the shear pins. In the case of many gas turbine engines, this is in the range of the fan's "windmilling" speed during the flight of an aircraft. Windmilling refers to the turbine-equivalent behavior of the fan as it is driven by air flowing through the engine. A resonance excited in this way can cause severe vibration, which imposes stress not only on the gas turbine engine but also on the connection thereof to the aircraft and on the aircraft. This is counteracted, for example, by specific flying maneuvers after blade loss, fine tuning the resonant frequency of other components and a corresponding outlay on materials in the production of structural components.

It is the object of the present invention to make available a bearing assembly which allows reliable support, especially of a shaft, with a minimum weight.

According to one aspect, a bearing assembly for a gas turbine engine is made available. The bearing assembly comprises a bearing (having a stator and a rotor rotatable relative to the stator, for example). The bearing assembly furthermore comprises a bearing bracket, which holds the bearing (in particular the stator, being connected in a fixed manner to the stator, for example). The bearing bracket is connected in a fixed manner, by a predetermined breaking device, to a connecting element, which is designed to be connected to a loadbearing structure of the gas turbine engine, and is optionally connected thereto. The bearing assembly furthermore comprises a first toothed component mounted (in particular rotatably) on the bearing bracket and a second toothed component secured on the connecting element. The bearing assembly is designed in such a way that the first toothed component and the second toothed component can be brought into or are in meshing engagement in such a way, after or, optionally, owing to destruction of the predetermined breaking device, that one of the toothed components (in particular the first) can roll on the other of the toothed components.

Each of the toothed components comprises a multiplicity of raised portions (arranged adjacent to one another, in particular adjacent to one another in the circumferential direction). The raised portions are also referred to below as teeth but are not restricted to involute forms or the like, for example. For example, the teeth can each also be designed as triangular, trapezoidal or semicircular.

By means of the rolling of the toothed components in engagement with one another, it is possible to produce a relative motion of the two components in the circumferential direction, in particular through unequal numbers of teeth. This relative motion can be used to dissipate load peaks. As an option, this relative motion, in particular rotary motion, can be converted into an axial motion by means of a thread or similar mechanism. This can be used to reestablish a (e.g. frictional) connection. The bearing configuration regained in this way (e.g. after a blade loss) leads to a change in the natural frequency of the rotor, and loads transmitted into the structure may be lower. The bearing assembly serves to reduce loads. As a consequence, an optional backup bearing can be constructed with a lower outlay on materials, and therefore reliable support for a shaft can be made possible with a reduced overall weight. After the destruction of the predetermined breaking device, the bearing bracket can be moved relative to the connecting element.

The first toothed component and the second toothed component have a different number of teeth, for example. As an alternative or in addition, a relative motion in the circumferential direction can also be achieved through appropriate configuration of the teeth while keeping the number of teeth the same. For example, the first toothed component has fewer teeth than the second toothed component, e.g. at least one tooth less. If the predetermined breaking device is destroyed by an unbalance of a shaft supported by means of the bearing assembly, this unbalance can then lead to an orbiting motion of the shaft. By means of this orbiting motion, in particular, one toothed component can roll on the other. Owing to the different number of teeth, a relative rotation is imparted to the toothed components. This rotation can be counter to the direction of rotation of the orbiting motion. By virtue of friction due to this rotation, there can be greater dissipation of load peaks.

As an option, the first toothed component can be designed as a gearwheel with external toothing and the second toothed component can be designed as a ring gear with internal toothing. The gearwheel can be arranged within the ring gear.

In one embodiment, the first toothed component is supported on the bearing bracket via a thread and is therefore in engagement via the thread. By means of a rotation of the first toothed component relative to the bearing bracket (in particular by means of the rolling of the first toothed component on the second toothed component), it can be screwed along the thread. Thus, an unbalance (e.g. due to a fan blade off event) can be used to shift the first toothed component axially (in relation to the axis of rotation of the rotor of the bearing, relative to the stator of the bearing). In other words, a corresponding relative motion of the two toothed components in the circumferential direction can be converted into an axial motion of one component, which can be used to close a radial gap.

In a development, a holder carrying the first toothed component is in engagement with the bearing bracket via the thread. The holder and the first toothed component can be embodied in an integral way or connected to one another. The holder can have a stop. The connecting element can have a counterstop. The bearing assembly can be designed in such a way that, when the predetermined breaking device is intact, a play (in particular a radial play) is formed between the stop and the counterstop. As an option, the play (in particular radial play) present between the stop and the counterstop can be varied by means of a screwing motion of the holder relative to the bearing bracket along the thread. It is thus possible to use the orbiting motion to change the size of the play.

In a development, the stop of the holder can strike against the counterstop by means of the screwing motion relative to the bearing bracket along the thread. In this way, it is possible, in particular, to fix two components relative to one another that can be moved relative to one another after the destruction of the predetermined breaking device.

As an option, the bearing bracket can be fixed on the connecting element through stop contact of the stop with the counterstop. By means of the bearing assembly, it is thus possible to absorb the greatest load peaks by destruction of the predetermined breaking device after an exceptional event (e.g. the loss of a fan blade) and then, after a period of time, to connect the initially movable bearing bracket in a fixed manner to the connecting element once again. In the case of a gas turbine engine, the rotational speed of the supported shaft generally decreases during this period of time, in particular owing to the fuel supply being switched off. After a decrease in the radial loads (and optionally before a renewed rise caused by resonance during windmilling), the bearing bracket and connecting element are fixed to one another again. This allows particularly reliable support for the shaft. Moreover, an optional backup bearing has to hold the shaft only for a short period of time and, accordingly, can be produced and installed with a lower outlay on materials. The period of time is furthermore adjustable, in particular by means of the number of teeth of the toothed components and the geometrical dimensions of the thread (in particular the tooth shape and geometry, thread pitch and length). Thus, provision can be made for these parameters to be adapted or to be adaptable to the respective gas turbine engine. Fixing of the bearing bracket on the connecting element is also understood to mean fixing with a remaining residual gap as long as forces can be transmitted (continuously) via a load path formed. As an alternative, however, complete fixing with closure of the gap is also possible.

In a development, the stop and/or the counterstop are of conical design, in particular such that the respective cone is aligned concentrically with the central axis of rotation of the gas turbine engine. A play between the stop and the counterstop can thereby be successively reduced. By virtue of a conical design of the stop and/or the counterstop, the bearing bracket can be (re-)centered. Moreover, such an embodiment allows gentle fixing of the bearing bracket. In particular, the centering can lead to a return of the bearing to the original position. It is thereby possible to change the natural frequency of the supported shaft, in particular in such a way that it lies outside the excitation frequency due to windmilling, with a sufficient margin.

As an alternative or in addition, the toothed components are each of conical design. It is thereby possible, for example, to maintain the engagement of the toothed components even when the bearing bracket is centered to a greater and greater extent and the radial deflection decreases.

As an option, the cone described by the first and/or the second toothed component has an opening angle which is smaller than or equal to an opening angle of the cone described by the stop and/or by the counterstop. However, embodiments are also conceivable in which the opening angle described by the first and/or the second toothed component has an opening angle which is larger than an opening angle of the cone described by the stop and/or by the counterstop.

In one embodiment, the bearing assembly comprises a lubricant feed. The lubricant feed can be configured to supply lubricant to the thread, particularly between the holder and the bearing bracket. This enables the holder to be screwed along the thread particularly smoothly, and jamming in normal operation can be prevented.

According to one aspect, a gas turbine engine is provided, in particular a gas turbine engine for an aircraft. The gas turbine engine comprises at least one bearing assembly according to any embodiment described herein. The gas turbine engine can furthermore comprise a fan driven by a shaft of the gas turbine engine. In this case, the bearing of the bearing assembly can rotatably support the shaft.

In this way, it is possible to make available a gas turbine engine which allows reliable support of the shaft with a low weight. By reconnecting the bearing to the loadbearing structure of the gas turbine engine, an aircraft which has the gas turbine engine can remain safely in the air for a relatively long period of time without the occurrence of severe vibration and loads, even after a fan blade off event.

According to one aspect, a method for producing a bearing assembly for a gas turbine engine, in particular for producing a bearing assembly according to any embodiment described herein, is made available. The method comprises the following steps (optionally but not necessarily in this order): First step: making available a bearing (having a stator and a rotor rotatable relative thereto) and a bearing bracket, which holds the bearing and is secured by a predetermined breaking device on a connecting element, which can be connected or is connected to a loadbearing structure of the gas turbine engine. Second step: supporting a first toothed component on the bearing bracket in such a way that, owing to destruction of the predetermined breaking device, the first toothed component and a second toothed component fixed on the connecting element can be brought into or are in engagement in such a way that one of the toothed components can roll on the other.

In one embodiment of the second step, the first toothed component is supported on the bearing bracket by means of a thread. The method can furthermore comprise the following steps:

specifying a period of time from destruction of the predetermined breaking device, in particular until intended fixing of the bearing bracket on the connecting element;

optionally: specifying a speed of the rotor relative to the stator and/or a precession frequency; and determining a number of teeth of the first toothed component, a number of teeth of the second toothed component and geometrical dimensions of the thread (e.g. a number of turns and/or shape, thread pitch and thread length) in such a way that, after the destruction of the predetermined breaking device, a stop connected in a fixed manner to the first toothed component strikes against a counterstop connected in a fixed manner to the bearing bracket after a period of time which corresponds to the specified period of time. If the specified speed of the rotor and/or the precession frequency are taken into account, particularly precise adaptations are possible.

optionally: designing teeth (e.g. in each case with an involute shape, as a semicircle, trapezium or triangle) of the toothed components and/or of a conically shaped stop and counterstop and/or the size of a radial gap which determines (optionally by means of a stop on a backup bearing) a mobility after destruction of the predetermined breaking point. These embodiments can be adapted to a specified gas turbine engine.

After this, the first toothed component, the second toothed component, a holder and/or the bearing bracket can be formed and made available with the determined number of teeth and/or turns (and a corresponding play).

Thus, reconnection of the bearing within a time matched to a particular gas turbine engine is possible, thereby making it possible to cope with an overload in a particularly reliable manner.

A person skilled in the art will understand that a feature or parameter which is described in relation to one of the above aspects can be applied with any other aspect, unless they are mutually exclusive. Furthermore, any feature or any parameter described here may be applied to any aspect and/or combined with any other feature or parameter described here, unless these are mutually exclusive.

Embodiments will now be described by way of example, with reference to the figures, in which.

Figure 1:
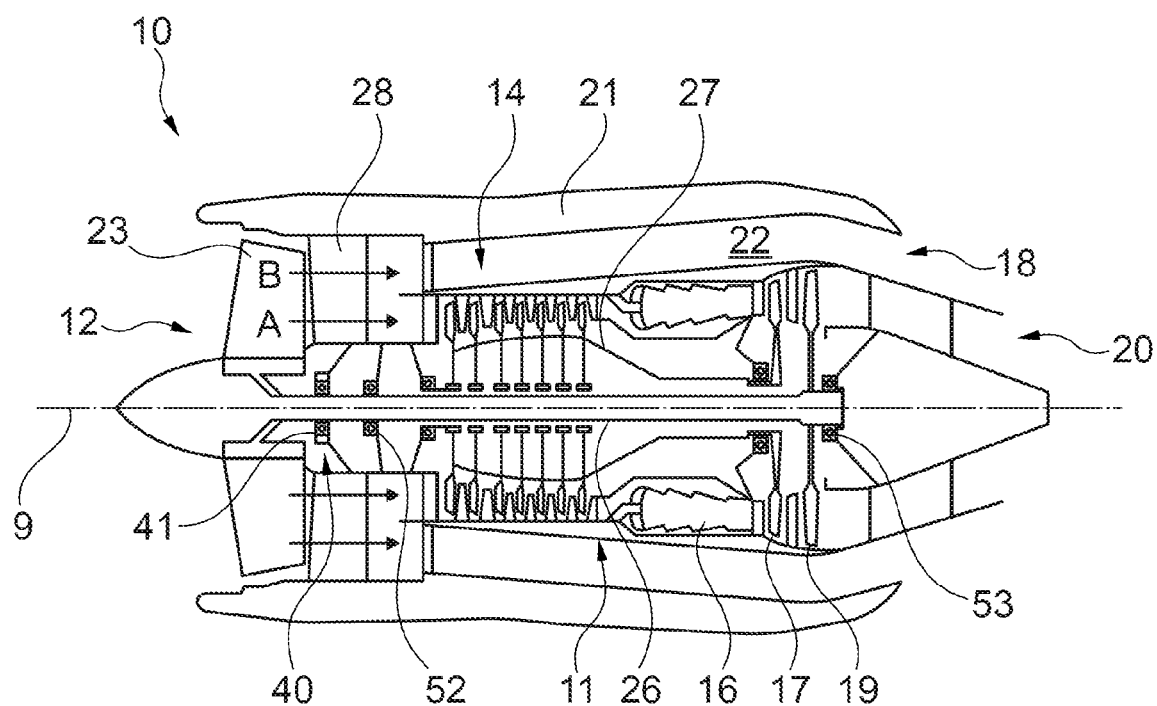
FIG. 1 shows a sectional side view of a gas turbine engine.

FIG. 1 illustrates a gas turbine engine 10 having a principal rotational axis 9. The gas turbine engine 10 comprises an air inlet 12 and a fan 23, which produces two air flows: a core air flow A and a bypass air flow B. The gas turbine engine 10 comprises a core engine 11, which receives the core air flow A. The core engine 11 comprises, in the sequence of axial flow, a compressor 14 (optionally divided into a low-pressure compressor and a high-pressure compressor), a combustion device 16, a high-pressure turbine 17, a low-pressure turbine 19 and a core thrust nozzle 20. A nacelle 21 surrounds the gas turbine engine 10 and defines a bypass duct 22 and a bypass thrust nozzle 18. The bypass airflow B flows through the bypass duct 22. The fan 23 is mounted on the low-pressure turbine 19 by means of a shaft 26 and is driven by said turbine.

During operation, the core air flow A is accelerated and compressed by the compressor 14. The compressed air expelled from the compressor 14 is introduced into the combustion device 16, where it is mixed with fuel and the mixture is burnt. The resultant hot combustion products then expand through, and thereby drive, the high pressure and low pressure turbines 17, 19 before being exhausted through the nozzle 20 to provide some propulsive thrust. The high-pressure turbine 17 drives the compressor 14 by means of a suitable connecting shaft 27. Generally speaking, the fan 23 provides the majority of the thrust.

Other gas turbine engines to which the present disclosure may be applied may have alternative configurations. For example, engines of this kind can have an alternative number of compressors and/or turbines and/or an alternative number of connecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Although the example described relates to a turbofan engine, the disclosure can be used, for example, in any type of gas turbine engine, e.g. an open-rotor engine (in which the fan stage is not surrounded by an engine nacelle) or a turboprop engine.

The geometry of the gas turbine engine 10, and components thereof, is/are defined by a conventional axis system, comprising an axial direction (which is aligned with the rotational axis 9), a radial direction (in the bottom-to-top direction in FIG. 1), and a circumferential direction (perpendicular to the view in FIG. 1). The axial, radial and circumferential directions are mutually perpendicular.

The gas turbine engine 10 comprises a bearing assembly 40. By means of the bearing assembly 40, the shaft 26 (which drives the fan 23) is supported rotatably on a loadbearing structure 28 of the gas turbine engine 10. The loadbearing structure is secured on the engine nacelle 21, for example. The bearing assembly 40 has a plurality of bearings, in the present example three bearings 41, 52, 53. One bearing 41 is arranged adjacent to the fan 23. In the present example, this bearing 41 is designed as a fixed bearing and can therefore transmit axial forces, although bearing 41 can also, in principle, be designed as a floating bearing. A further bearing 52 arranged downstream thereof is designed as a backup bearing. This bearing 52 is designed to provide the shaft 26 with reliable support if the bearing 41 arranged adjacent to the fan 23 is separated from the loadbearing structure 28, e.g. owing to the loss of a fan blade of the fan 23 during the operation of the gas turbine engine 10. At its end remote from the fan 23, the shaft 26 is supported rotatably on the loadbearing structure 28 by means of a third bearing 53. This bearing 53 has rolling elements in the form of rollers, for example.

Figure 2:
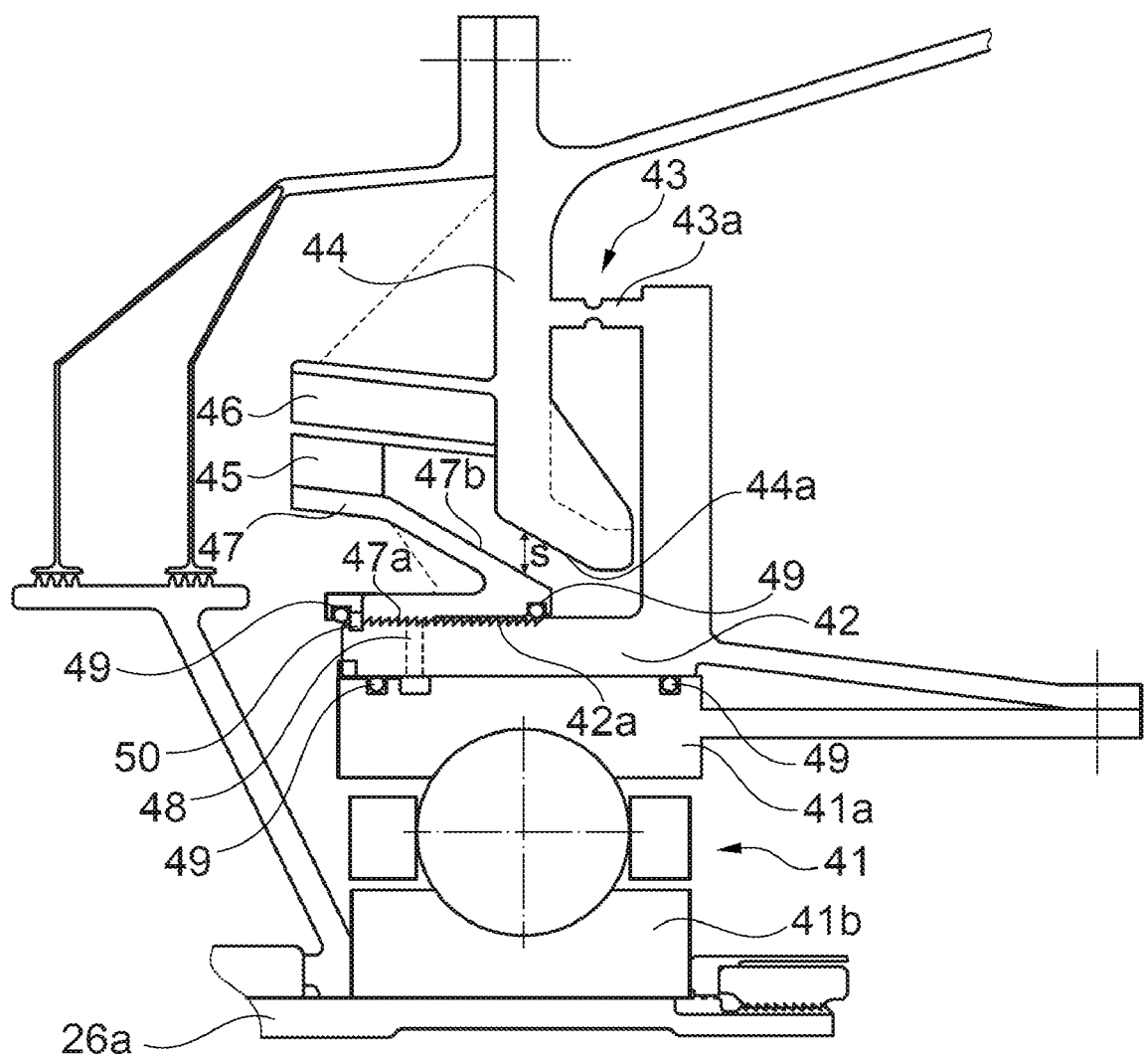
FIG. 2 shows an enlarged sectional view from the side of a part of the gas turbine engine having a bearing assembly.

FIG. 2 shows, in particular, the bearing 41 adjacent to the fan 23 and further elements of the bearing assembly 40.

Bearing 41 comprises a component which is fixed relative to the loadbearing structure 28. This component is referred to below as stator 41*a*. In the example under consideration, the stator 41*a* is a bearing outer ring. Bearing 41 furthermore comprises a component which is rotatable relative to the loadbearing structure 28. This component is referred to below as rotor 41*b*. The rotor 41*b* is secured on a connecting element 26*a* of the shaft 26, said connecting element being connected in a fixed manner to the shaft 26. Bearing 41 comprises a plurality of rolling elements, bearing 41 being a ball bearing in the example shown. It comprises balls which are arranged in a cage and support the rotor 41*b* rotatably within the stator 41*a*.

The stator 41*a* is mounted in a fixed manner on a bearing bracket 42, in the present case by means of two axially projecting flanges, although an integral design is also conceivable. The stator 41*a* is arranged within the bearing bracket 42. The bearing bracket 42 is secured on a connecting element 44 by means of a predetermined breaking device 43, in the example shown by means of a radially outward-projecting (disk-shaped) section of the bearing bracket 42. The bearing bracket 42 and the predetermined breaking device 43 and the connecting element 44 can be formed integrally with one another or, alternatively, mounted one on the other. In the example shown, the predetermined breaking device 43 comprises a multiplicity of shear pins 43a, which fail, e.g. fragment, when a specified (in particular radial) load is exceeded. The shear pins 43a extend in the axial direction. The connecting element 44 is mounted in a fixed manner on the loadbearing structure 28 (not illustrated in FIG. 2) of the gas turbine engine 10 (see FIG. 1). As an option, the connecting element 44 forms part of the loadbearing structure 28.

The bearing assembly 40 furthermore comprises a gear mechanism having a first toothed component, here in the form of an externally toothed gearwheel 45, and a second toothed component, here in the form of an internally toothed ring gear 46. The gearwheel 45 is accommodated in the ring gear 46. The ring gear 46 is secured on the connecting element 44 (alternatively being formed integrally therewith or with a part thereof), in the example shown on an axially projecting (conical) ring section. The ring section is optionally supported by means of a plurality of reinforcing ribs distributed in the circumferential direction (illustrated by a dashed line in FIG. 2).

The gearwheel 45 is secured on a holder 47 (alternatively being formed integrally therewith or with a part thereof). In the example shown, the holder 47 has a section with a V-shaped cross section. In the state shown in FIG. 2, where the predetermined breaking device 43 is intact, a tip circle of the gearwheel 45 is spaced apart from a root circle of the ring gear 46. Thus, in this state, no radial loads are transmitted via the gear mechanism.

Figure 3:
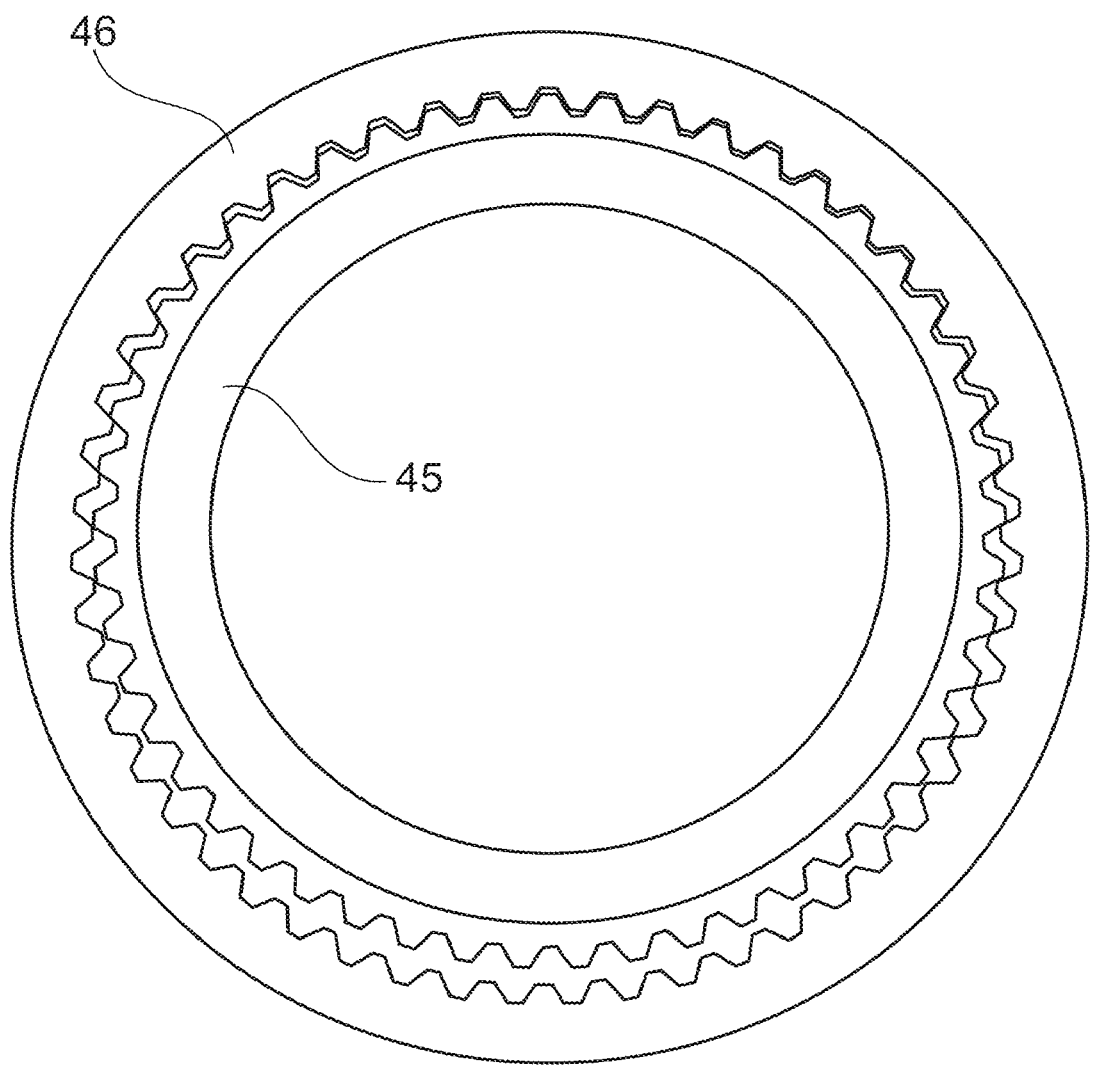
FIG. 3 shows a cross-sectional view of a gearwheel and of a ring gear of the bearing assembly of the gas turbine engine.

FIG. 3 shows the ring gear 46 and the gearwheel 45 accommodated therein. The gearwheel 45 has a smaller number of teeth than the ring gear 46, that is to say at least one tooth less. In the example shown in FIG. 3, the gearwheel 45 has 49 teeth and the ring gear 46 has 51 teeth. The gearwheel 45 has a smaller tip circle diameter than the ring gear 46. The gearwheel 45 can roll on the inside of the ring gear 46. Lubrication (active or passive) of the tooth flanks is optional.

In the state shown in FIG. 2 with intact shear pins 43a, the gearwheel 45 is arranged concentrically with the ring gear 46. If the shear pins 43a break owing to an overload due to an unbalance, the bearing bracket 42 becomes movable relative to the connecting element 44. Owing to the radial loads, the gearwheel 45 comes into meshing engagement (and contact) with the ring gear 46. If the bearing 41 has broken away from the loadbearing structure 28, the shaft 26 performs an orbiting motion corresponding to a precession owing to the unbalance. The shaft 26 thus serves as an eccentric for the gear mechanism. The orbiting shaft causes a revolving rolling motion of the gearwheel 45 on the ring gear 46. During this movement, the gearwheel 45 rotates relative to the ring gear 46.

As can be seen especially from FIG. 2, the bearing bracket 42 is provided with a thread 42a, in this case an external thread. The holder 47 is screwed onto this thread 42a by means of a matching thread 47a, in this case an internal thread. A destructible lock 50 prevents the holder 47 from rotating relative to the bearing bracket 42 during the normal operation of the gas turbine engine 10 (before an overload event) (e.g. by means of axially projecting teeth in engagement with the holder 47 and the bearing bracket 42). The lock 50 serves as an anti-rotation component. As an alternative or in addition, the lock 50 secures the holder 47 axially. As soon as the gearwheel 45 rolls on the ring gear 46 owing to an overload, the lock 50 breaks and allows rotation of the holder 47 relative to the bearing bracket 42. The thread 42a is oriented in such a way that the rolling motion of the gearwheel 45 predetermined by the direction of the orbiting motion screws the holder 47 in the direction of the connecting element 44.

The holder 47 has an (externally encircling) cone which faces the connecting element 44 and serves as a stop 47b. The connecting element 44 likewise has a cone. In this case, this is formed around the inside and serves as a counterstop 44a for the stop 47b. The opening angle of both cones is the same, and therefore the stop 47b and the counterstop 44a can be brought into surface contact (by a sufficient screwing motion of the holder 47). As a result, good load transmission can be ensured—another form of contact between the counterstop 44a and the stop 47b is likewise conceivable, however. In this case, the holder 47 screwed along the thread 42a of the bearing bracket 42 centers the bearing 41. During this process, a radial play S between the stop 47b and the counterstop 44a becomes smaller, until the stop 47b and the counterstop 44a are brought into surface contact with one another. Furthermore, the holder 47 is clamped firmly between the bearing bracket 42 and the connecting element 44 (specifically the conical part). Complete positive engagement is possible but not absolutely necessary. The backup bearing would also be relieved of load if there were a remaining residual gap. This gap can be lubricated since the conical stop 47b would rotate in the conical counterstop 44a. The bearing 41 is then fixed once again.

An end section of the thread 42a of the bearing bracket 42 can be roughened, can have a friction-increasing coating, can have a pitch which differs from the remaining part of the thread 42a and/or can be embodied in a geometrically different manner in some other way. As a result, the holder 47 rotates on the thread 42a in such a way as to be fixed in the end position (e.g. by plastic deformation), and therefore unintentional release is avoided.

In order to prevent the gearwheel 45 and the ring gear 46 from disengaging as centering progresses, they also have a conical shape, as illustrated particularly in FIG. 2. In the present case, the opening angle is more acute than that of the cones. As an option, the opening angle of the gearwheel 45 and the ring gear 46 is dimensioned in such a way that they disengage owing to the centering when the stop 47b enters into surface contact with the counterstop 44a, or shortly before this if the play S is already negligibly small.

The bearing 41 is supplied continuously with lubricant (in the present case oil). A lubricant channel can be seen on the radially outer side of the stator 41a in FIG. 2. From there, a lubricant feed in the form of a channel 48 for oil extends toward the threads 42a, 47a that are in engagement. In this way, lubricant is forced between the threads 42a, 47a, with the result that the holder 47 can be screwed unhindered against the connecting element 44 in the event of an overload. In order to avoid losing any lubricant during normal operation, the bearing assembly 40 comprises a plurality of sealing elements 49, e.g. O-rings. A respective sealing element 49 is arranged at each of the two axial ends of the thread 42a and seals off the holder 47 from the bearing bracket 42. The sealing elements 49 can furthermore reduce or prevent rattling of the holder 47 against the bearing bracket 42 and wear of the threads 42a, 47a.

As an alternative or in addition to a lubricant supply, a passive lubricant can be applied during the assembly of the bearing assembly 40, in particular to the thread 42a of the bearing bracket 42.

The gear mechanism, the stop 47b and the counterstop 44a are surrounded by a lubricant trough. These parts are supplied with lubricant (via the bearing 41 and/or a squeeze oil film damper). Any play S which may possibly remain between the stop 47b and the counterstop 44a is thereby closed with lubricant, thus enabling radial loads to be transmitted better and ensuring that there is no local overheating. Vibration can furthermore be damped by the lubricant. As an option, the gap formed by the play S can be supplied directly with lubricant.

On its side facing away from the surface of the stop 47b, the holder 47 has optional reinforcing ribs, illustrated in FIG. 2 by means of a dashed line. Similarly, the connecting element 44 has optional reinforcing ribs on its side facing away from the surface of the counterstop 44a.

Figure 4:
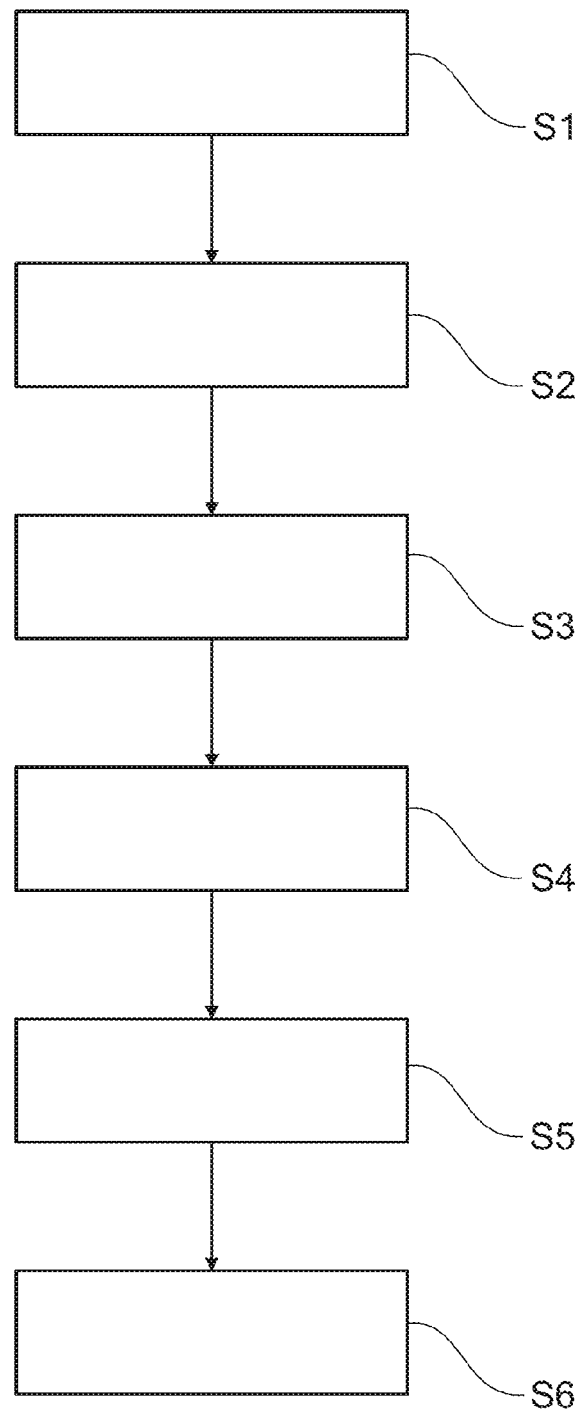
FIG. 4 shows a method for producing a bearing assembly for a gas turbine engine.

FIG. 4 shows a method for producing the bearing assembly 40 shown in FIGS. 1 to 3.

In a first step S1, a period of time from destruction of the predetermined breaking device is first of all specified (e.g. 10 seconds for some types of gas turbine engine).

In a second step S2, a speed of the rotor 41b (in particular the variation of the speed after a blade loss) or parameters associated with the speed (e.g. a typical airspeed) relative to the stator 41b and/or an orbiting or precession frequency of the shaft 26 are/is specified.

In a third step S3, numbers of teeth, in particular a toothed ratio and/or a tooth difference between the gearwheel 45 and the ring gear 46, and the geometrical dimensions of the thread 42a, 47a (tooth shape and tooth geometry, thread pitch and length) are determined in such a way from the speed of the rotor (variation) and/or the orbiting/precession frequency that, after the destruction of the predetermined breaking device 43, the stop 47b connected in a fixed manner to the gearwheel 45 strikes against the counterstop 44a connected in a fixed manner to the bearing bracket 42 after a period of time which is equal to the specified period of time. In order to increase (or reduce) the period of time, it is possible, for example, to increase (reduce) the number of turns of the thread. In designing the thread, the axial and radial loads caused by the impact of the cone are taken into account.

In a fourth step S4, the gearwheel 45, the ring gear 46, the holder 47 and the bearing bracket 42 are formed with the numbers of teeth determined and/or the geometry of the thread 42a.

Steps S1 to S4 are optional, in particular for adaptation to a given gas turbine engine 10 in the best possible way.

In a fifth step S5, the bearing 41 (with the stator 41a and the rotor 41b rotatable relative thereto) and the bearing bracket 42, which holds the stator 41a and is secured on the connecting element 44 by the predetermined breaking device 43, are made available (in particular in accordance with steps S1 to S4), wherein the ring gear 46 is fixed on the connecting element 44.

In a sixth step S6, the gearwheel 45 is arranged on the bearing bracket 42 in such a way that it is supported thereon, more specifically in such a way that the gearwheel 45 and the ring gear 46 can be brought into engagement by destruction of the predetermined breaking device 43, thus enabling the gearwheel 45 to roll on the ring gear 46 and to move in its axial position relative to the ring gear 46 by virtue of the thread. This results in centering and reconnection of the bearing 41 with the loadbearing structure 28.

Figure 5:
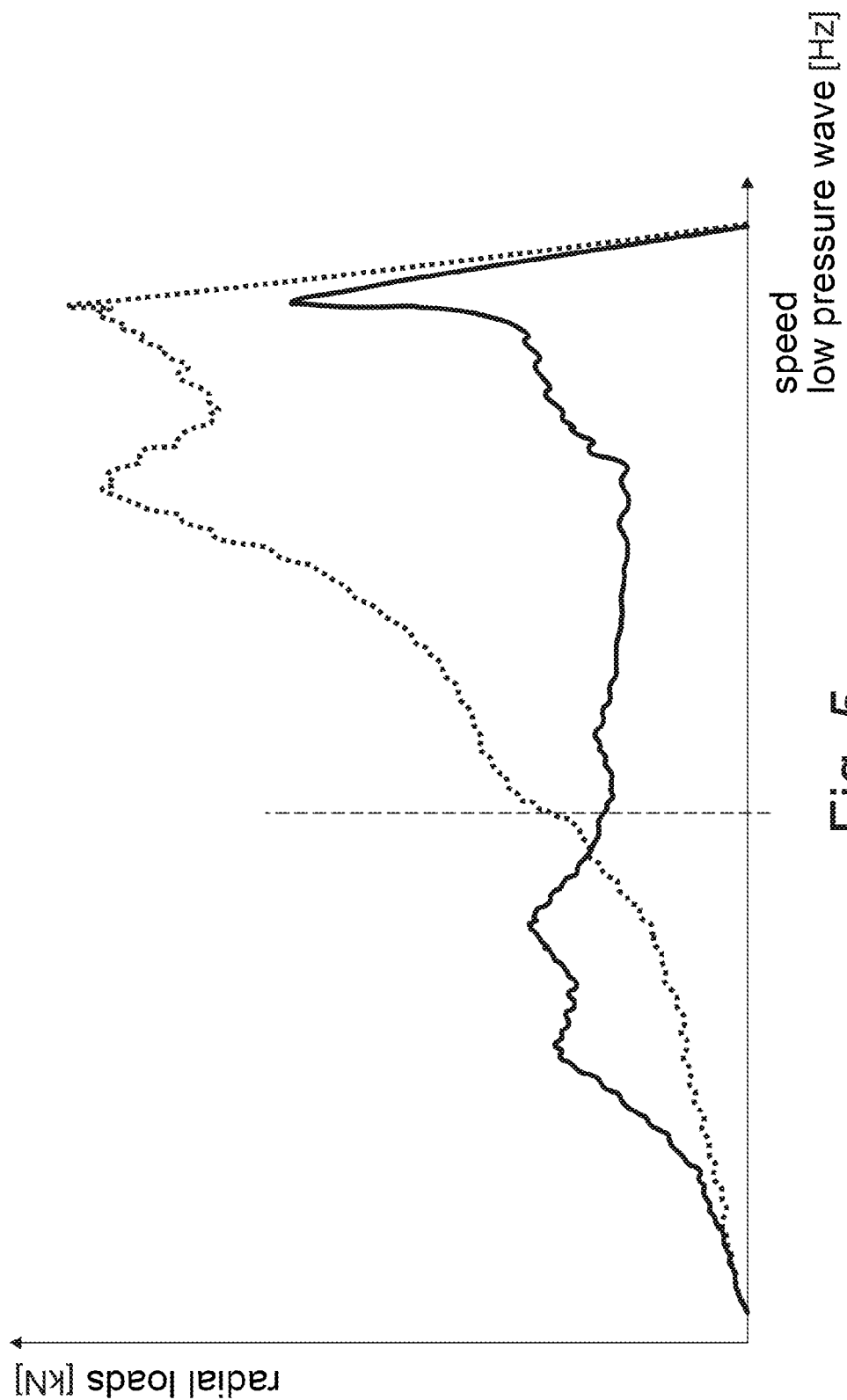
FIG. 5 shows a schematic diagram of loads on a shaft after the loss of a fan blade of a gas turbine engine.

FIG. 5 shows schematically the radial loads due to a loss of a fan blade during the operation of an illustrative gas turbine engine. A dashed line illustrates a comparison case, in which the fan bearing does not have a predetermined breaking device. Beginning with the highest speeds, very high loads are introduced into the loadbearing structure via the bearing. By virtue of the fixed connection, the unbalance due to the blade loss has severe effects, even with the successively decreasing speed (due to engine shutdown after the blade loss).

In comparison, the solid line illustrates a case with a predetermined breaking device. The destruction of the predetermined breaking device ensures that the radial loads introduced into the loadbearing structure are significantly lower. Due to the detachment of the bearing adjacent to the fan, however, the shaft has a different resonant frequency from normal operation. At relatively low speeds, as shown in FIG. 5, this leads to a renewed rise in the radial loads, particularly in the form of severe vibration. In many cases, the resonant frequency is in the range of the speeds which are typically reached in flight owing to the air pressure against the fan of the deactivated gas turbine engine (in the case of some gas turbine engines in the range of 20 to 30 Hz, for example).

By means of the above-described bearing assembly 40, the gas turbine engine 10 having a bearing assembly 40 of this kind for load reduction, and the method for producing the bearing assembly 40, it is possible to reconnect the bearing 41 to the loadbearing structure 28 after a time delay following the severing of the shear pins and thus to change the resonant frequency again, in particular to increase it (optionally to the previous value). In this case, appropriate timing can allow particularly low loads. The period of time up to reconnection can be adjusted, in particular, by means of the number of turns of the thread 42a. It is thereby possible for the bearing 41 of the slowing shaft 26 to be centered and fixed on the loadbearing structure 28 after the most severe loads have died down and before the resonant range is reached (e.g. at the position of the vertical dashed straight line in FIG. 5). As a consequence, it is possible to construct the backup bearing 52 and/or parts of the loadbearing structure 28 with a lower outlay on materials while supporting the shaft 26 in a particularly reliable manner.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

In particular, the bearing 41 can be a fixed bearing or a floating bearing. As an alternative or in addition, another of the bearings 52, 53 of the shaft 26 can be provided with the clutch 45 and the fixing device 46 or, as an alternative or in addition, a bearing of another shaft of the gas turbine engine 10, e.g. of the connecting shaft 27.

LIST OF REFERENCE SIGNS

9 Principal rotational axis
10 Gas turbine engine
11 Core engine
12 Air intake
14 Compressor
16 Combustion device
17 High pressure turbine
18 Bypass thrust nozzle
19 Low pressure turbine
20 Core thrust nozzle
21 engine nacelle
22 Bypass duct
23 Fan
26 Shaft 26a connecting element
27 Interconnecting shaft
28 loadbearing structure
40 bearing assembly
41 bearing
41a stator
41b rotor
42 bearing bracket
42a thread
43 predetermined breaking device
43a shear pin
44 connecting element
44a counterstop
45 gearwheel (first toothed component)
46 ring gear (second toothed component)
47 holder
47a thread
47b stop
48 channel (lubricant feed)
49 sealing element
50 lock
52 bearing (backup bearing)
53 bearing
A core air flow
B Bypass airflow
S play

The invention claimed is:

1. A bearing assembly for a gas turbine engine, comprising:
   a predetermined breaking device;
   a connecting element connected to a loadbearing structure of the gas turbine engine;
   a bearing;
   a bearing bracket, which holds the bearing and is secured by the predetermined breaking device on the connecting element;
   a first toothed component mounted on the bearing bracket; and
   a second toothed component fixed on the connecting element, wherein, after the destruction of the predetermined breaking device, the first toothed component and the second toothed component are brought into engagement with one another in such a way that one chosen from the first toothed component and the second toothed component rolls on the other of the first toothed component and the second toothed component.

2. The bearing assembly according to claim 1, wherein the first toothed component has a different number of teeth than the second toothed component.

3. The bearing assembly according to claim 1, wherein the first toothed component is a gearwheel and the second toothed component is a ring gear.

4. The bearing assembly according to claim 1, wherein the bearing bracket includes a thread and the first toothed component is supported on the bearing bracket via the thread.

5. The bearing assembly according to claim 4, further comprising:
   a holder carrying the first toothed component, wherein the holder is in engagement with the bearing bracket via the thread, and wherein the holder includes a stop; and
   wherein the connecting element includes a counterstop, and a between the stop and the counterstop is varied by a screwing motion of the holder relative to the bearing bracket.

6. The bearing assembly according to claim 5, wherein the stop of the holder strikes against the counterstop by the screwing motion relative to the bearing bracket along the thread.

7. The bearing assembly according to claim 5, wherein the bearing bracket is fixed on the connecting element through contact of the stop with the counterstop.

8. The bearing assembly according to claim 5, wherein the stop and the counterstop are each of conical shape.

9. The bearing assembly according to claim 8, wherein at least one chosen from the first toothed component and the second toothed component includes an opening angle which is smaller than or equal to an opening angle of at least one chosen from the stop and the counterstop.

10. The bearing assembly according to claim 4, further comprising a lubricant feed which is configured to supply lubricant to at least one chosen from the thread and into a gap to be closed.

11. The bearing assembly according to claim 1, wherein the first toothed component and the second toothed component are each of conical shape.

12. A gas turbine engine, comprising a fan, a shaft driven by the fan, and a bearing assembly according to claim 1, wherein the bearing of the bearing assembly supports the shaft.

13. The gas turbine engine according to claim 12, wherein the gas turbine engine is an aircraft engine.

14. A method for producing a bearing assembly for a gas turbine engine, comprising:
   providing:
     a predetermined breaking device;
     a connecting element connected to a loadbearing structure of the gas turbine engine;
     a bearing;
     a bearing bracket, which holds the bearing and is secured by the predetermined breaking device on the connecting element;
     a first toothed component; and
     a second toothed component;
   supporting the first toothed component on the bearing bracket such that, owing to destruction of the predetermined breaking device, the first toothed component and the second toothed component fixed on the connecting element are brought into engagement with one another such that one chosen from the first toothed component and the second toothed component rolls on the other of the first toothed component and the second toothed component.

15. The method according to claim 14, wherein the first toothed component is supported on the bearing bracket via a thread and further comprising:
   determining a specified period of time from destruction of the predetermined breaking device;
   determining a number of teeth of the first toothed component, a number of teeth of the second toothed component and geometrical dimensions of the thread such that, after the destruction of the predetermined breaking device, a stop connected in a fixed manner to the first toothed component strikes against a counterstop connected in a fixed manner to the bearing bracket after a period of time which corresponds to the specified period of time.

* * * * *